Dec. 6, 1949     F. F. MILLER, JR     2,490,146
DIFFERENTIAL GEARING
Filed Dec. 28, 1945

INVENTOR.
FRED F. MILLER Jr.
BY
ATTORNEYS

Patented Dec. 6, 1949

2,490,146

UNITED STATES PATENT OFFICE 2,490,146

DIFFERENTIAL GEARING

Fred F. Miller, Jr., Berkley, Mich., assignor to The Gear Grinding Machine Company, Hamtramck, Mich., a corporation of Michigan Application December 28, 1945, Serial No. 637,606

5 Claims. (Cl. 74—713)

The invention relates to differential gearing such as are used in connection with vehicle driving axles and the instant application forms a continuation in part of application, Serial No. 605,234, filed July 16, 1945, now abandoned. More particularly, the invention relates to that type of differential gearings in which under certain circumstances unequal torque is transmitted from the driving member to the respective driven members. In general, this is accomplished by the use of planetary pinions between and in mesh with a pair of driven gears, said pinions having an eccentric connection to the driving member.

It is the object of the invention to obtain an improved construction of this type and to this end the invention consists in the construction as hereinafter set forth.

Figure 1:
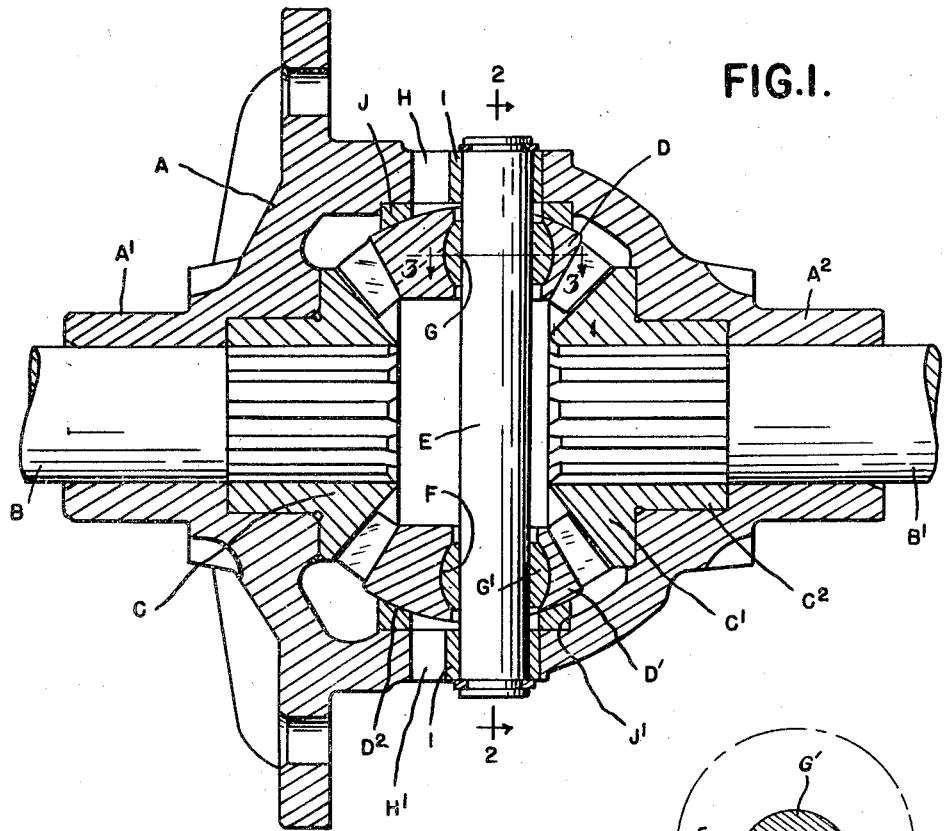
Fig. 1 is a central section through the differential gearing in the plane of the axis of the driven shafts.
Figure 2:
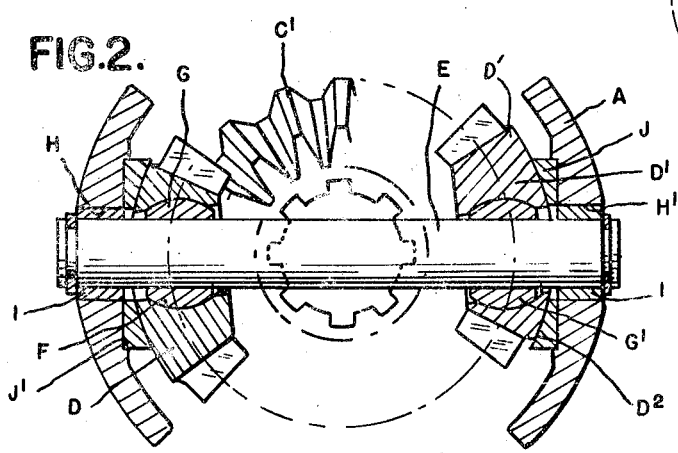
Fig. 2 is a transverse section on line 2—2, Fig. 1, but with some of the elements differently positioned.
Figure 3:
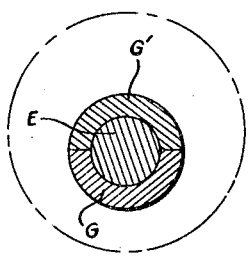
Fig. 3 is a cross section through the shaft and bushing on line 3—3, Fig. 1.

As illustrated, A is the housing for enclosing the differential gearing provided at its opposite ends with hub portion $A^1$, $A^2$ in which the driven shafts B, B' are journaled in axial alignment. C and C' are the driven bevel gear wheels splined respective to the shafts B and B' and having hub portions $C^2$ which engage cylindrical recesses in the housing A. D and D' are planetary bevel pinions in mesh with the gear wheels C and C' on diametrically opposite sides thereof and E is a shaft on which both of said pinions are mounted forming a driving connection therefor from the housing A. The shaft E instead of being concentric with the axes of the pinions D and D' passes through eccentrically disposed apertures therein. These apertures have segmental spherical bearing portions F which are larger in diameter than the shaft E. G and G' are complementary bushing members having external segmental spherical surfaces for fitting into the spherical bearings F forming a universal pivotal connection therewith and also having internal segmental cylindrical portions for fitting the shaft E. This permits of separately engaging the complementary members G and G' with the spherical bearing F after which the shaft E may be engaged therewith by an axial movement. The shaft E extends beyond the pinions D and D' to enter slots H and H' in diametrically opposite sides of the housing A. These slots receive bearing blocks I sleeved on said shaft E and hold said shaft against any movement in the transverse plane (Fig. 2). The slots H and H' are, however, elongated permitting movement of the blocks I and the shaft E longitudinally of said housing. The arrangement is such that when the pinions D and D' rotate about their own axes and in mesh with the gear wheels C and C', the shaft E and bearing blocks I will be moved axially of the driven shafts in the plane of Fig. 1. On the other hand, movement of the shaft E in the transverse plane (Fig. 2) is prevented but the pinions D and D' due to their eccentricity will oscillate relative to the axis of the gear wheels C and C'. To maintain these pinions always concentric with the axis of the gear wheels C and C', the outer end of each pinion has a spherical surface as indicated at $D^2$ which engages a spherical bearing surface on an annular member J. Each member J engages a cylindrical recess J' in the wall of the housing A which holds it against displacement. Thus, each revolution of the pinions D and D' will cause an oscillation thereof relative to the axis of the gear wheels C and C' while the spherical bearing on annular members J will cause a tilting of the pinion during this oscillation to maintain the teeth thereof always in proper mesh with the teeth of the gear wheels.

Operation

Normally the pinion D and D' are in a position where the shaft E is at the center of its movement in the slot H and H' in which position equal torque will be transmitted from the pinions to the driven gears C and C'. When, however, the driven shafts B and B' rotate at different angular speeds, as where the vehicle is turning, this will cause a revolution of each of the pinions about their respective axes which will change the leverage transmitting maximum torque first to one and then to the other of the driven shafts. This will also occur where traction is lost by one of the ground wheels of the vehicle so as to permit it to spin and, as a consequence, the torque transmitted to this wheel is lessened and greater torque is transmitted to the other wheel. While the maximum difference in torque only exists at one point in each revolution of the pinion, it may be sufficient to drive the vehicle and stop the spinning.

What I claim as my invention is:

1. In a differential gearing, a pair of spaced driven gears and a surrounding driving member in coaxial relation to each other, a planetary pinion intermediate said gears having an eccentrically disposed aperture therethrough, a shaft passing through said aperture and engaging said driving member with freedom for movement axially of said driving member, and a universal pivotal connection between said shaft and pinion permitting the tilting of the latter on said shaft during said axial movement.

2. In a differential gearing, a pair of spaced driven gears and a surrounding driving member in coaxial relation to each other, said driving member having an axially extending slot therein a planetary pinion between said gears having an eccentrically disposed aperture therethrough, a shaft extending through said aperture and engaging said axially extending slot in said driving member, a universal pivotal connection between said shaft and pinion, and means for maintaining said pinion with its axis of rotation intersecting the common axis of said gears and driving member.

3. In a differential gearing, a pair of spaced driven gears and a surrounding driving member in coaxial relation to each other, said driving member having an axially extending slot therein a planetary pinion intermediate said driven gears having an eccentrically disposed aperture therethrough, a shaft extending through said aperture and engaging said axially extending slot in said driving member, a universal pivotal connection between said shaft and pinion, and means forming a spherical engagement between said pinion and driving member for holding said pinion in mesh with said gears.

4. In a differential gearing, a pair of spaced driven gears and a surrounding driving member in coaxial relation to each other, said driving member having an axially extending slot therein a planetary pinion between said gears having an eccentrically disposed aperture therethrough, the outer end of said pinion having a convex spherical surface, a shaft extending through said aperture and engaging said axially extending slot in said driving member, an annular member surrounding said shaft and secured to said driving member, said annular member having a concave spherical surface engaging the convex surface of said pinion to hold the latter in mesh with said gears while permitting a limited oscillation about the axis thereof, and a universal pivotal connection between said shaft and said pinion.

5. In a differential gearing, a pair of spaced driven gears and a surrounding driving housing all in coaxial relation to each other, said driving member having axially extending slots on diametrically opposite sides thereof a pair of planetary pinions in mesh with said driven gears on diametrically opposite sides thereof, each of said pinions having an eccentrically disposed aperture therethrough with a segmental spherical surface and also having a convex spherical outer end surface, a shaft extending through the apertures in said pinions and beyond the same to engage said axially extending slots in said housing, annular members surrounding said shaft and secured to said housing, said annular members having concave spherical surfaces engaging the convex spherical surfaces of said pinions to hold the latter in mesh with said gears while permitting limited oscillation thereof about the axis of said gears, and complementary bushing segments in each of said apertures externally fitting the spherical surfaces thereof and internally fitting said shaft to form a universal pivotal connection between each pinion and shaft.

FRED F. MILLER, Jr.

REFERENCES CITED

The following references are of record in the file of this patent:

UNITED STATES PATENTS

| Number | Name | Date |
|---|---|---|
| 1,888,656 | Boynton | Nov. 22, 1932 |
| 1,948,095 | Boynton | Feb. 20, 1934 |
| 2,067,952 | Scurlock | Jan. 19, 1937 |
| 2,187,843 | Rzeppra | Jan. 23, 1940 |
| 2,392,441 | Wildhaber | Jan. 8, 1946 |

FOREIGN PATENTS

| Number | Country | Date |
|---|---|---|
| 2,392,441 | Germany | Nov. 27, 1931 |